(12) United States Patent
Sipe

(10) Patent No.: US 8,380,501 B2
(45) Date of Patent: Feb. 19, 2013

(54) PARCEL ADDRESS RECOGNITION BY VOICE AND IMAGE THROUGH OPERATIONAL RULES

(75) Inventor: Stanley W. Sipe, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 273 days.

(21) Appl. No.: 12/846,957

(22) Filed: Jul. 30, 2010

(65) Prior Publication Data

US 2011/0035224 A1 Feb. 10, 2011

Related U.S. Application Data

(60) Provisional application No. 61/231,442, filed on Aug. 5, 2009.

(51) Int. Cl.
*G10L 15/22* (2006.01)
*G06K 9/62* (2006.01)

(52) U.S. Cl. ........ 704/235; 704/236; 704/270; 209/584; 382/101; 700/226

(58) Field of Classification Search ............ 704/231, 704/235, 236, 237, 251, 255, 270; 382/101, 382/102; 209/584, 900; 700/223, 226
See application file for complete search history.

(56) References Cited

U.S. PATENT DOCUMENTS

| | | | |
|---|---|---|---|
| 5,794,789 A * | 8/1998 | Payson et al. ............. | 209/549 |
| 6,370,446 B1 * | 4/2002 | Divine ..................... | 700/226 |
| 6,577,749 B1 * | 6/2003 | Rosenbaum ............... | 382/101 |
| 6,587,572 B1 * | 7/2003 | Suchenwirth-Bauersachs et al. ........................ | 382/101 |
| 7,095,875 B2 * | 8/2006 | Rundle et al. ............. | 382/101 |
| 7,145,093 B2 * | 12/2006 | Mampe et al. ............ | 209/584 |
| 7,436,979 B2 * | 10/2008 | Bruce et al. .............. | 382/101 |
| 8,085,980 B2 * | 12/2011 | Rundle ..................... | 382/101 |
| 8,260,455 B2 * | 9/2012 | Redford et al. ........... | 700/230 |
| 2003/0085162 A1 * | 5/2003 | Daniels et al. ............ | 209/584 |
| 2004/0011711 A1 * | 1/2004 | Steinmetz et al. ........ | 209/546 |
| 2005/0094850 A1 * | 5/2005 | Nakao ...................... | 382/103 |
| 2006/0030969 A1 * | 2/2006 | Norris et al. ............. | 700/215 |
| 2009/0089236 A1 * | 4/2009 | Lamprecht et al. ....... | 706/46 |
| 2009/0110284 A1 * | 4/2009 | Lamprecht et al. ....... | 382/187 |
| 2010/0145504 A1 * | 6/2010 | Redford et al. ........... | 700/227 |
| 2010/0256978 A1 * | 10/2010 | Rosenbaum ............... | 704/244 |
| 2011/0033083 A1 * | 2/2011 | Sipe ......................... | 382/101 |
| 2011/0150270 A1 * | 6/2011 | Carpenter et al. ........ | 382/101 |
| 2011/0213611 A1 * | 9/2011 | Rauh ........................ | 704/233 |
| 2012/0089403 A1 * | 4/2012 | Sipe ......................... | 704/270 |

FOREIGN PATENT DOCUMENTS

WO  WO 2007/135137  * 11/2007

* cited by examiner

*Primary Examiner* — Martin Lerner

(57) ABSTRACT

A system, method, and computer-readable medium for parcel address recognition. A method includes receiving an address input and producing candidate address results corresponding to the address input. The method includes receiving operational scheme knowledge describing the mode of operation of a parcel processing system, and receiving at least one operational rule corresponding to the operational scheme knowledge. The method includes applying the at least one operational rule to the candidate address results and producing and storing a finalized result according to the operational rule and the candidate address results.

21 Claims, 3 Drawing Sheets

PARCEL ADDRESS RECOGNITION BY VOICE AND IMAGE THROUGH OPERATIONAL RULES

CROSS-REFERENCE TO OTHER APPLICATION

This application claims the benefit of the filing date of U.S. Provisional Patent Application 61/231,442, filed Aug. 5, 2009, which is hereby incorporated by reference.

TECHNICAL FIELD

The present disclosure is directed, in general, to address recognition and correction during parcel processing.

BACKGROUND OF THE DISCLOSURE

Accurate recognition of addresses on parcels is desirable.

SUMMARY OF THE DISCLOSURE

Various disclosed embodiments include a system and method for parcel address recognition. A method includes receiving an address input and producing candidate address results corresponding to the address input. The method includes receiving operational scheme knowledge describing the mode of operation of a parcel processing system, and receiving at least one operational rule corresponding to the operational scheme knowledge. The method includes applying the at least one operational rule to the candidate address results and producing and storing a finalized result according to the operational rule and the candidate address results.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
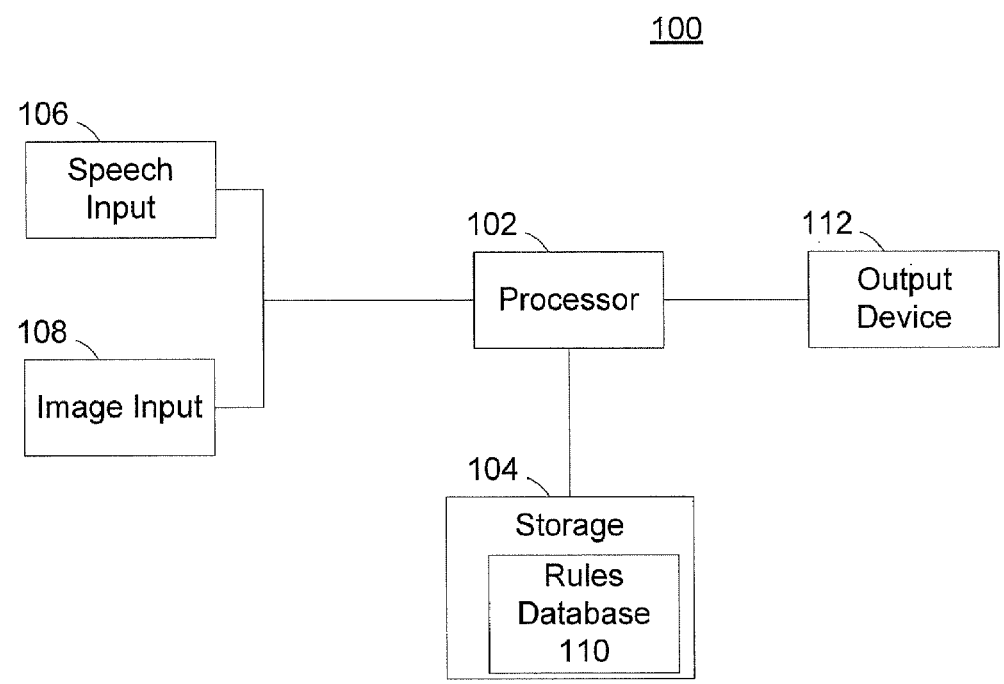
FIG. 1 shows a block diagram of an exemplary system in accordance with disclosed embodiments.
Figure 2:
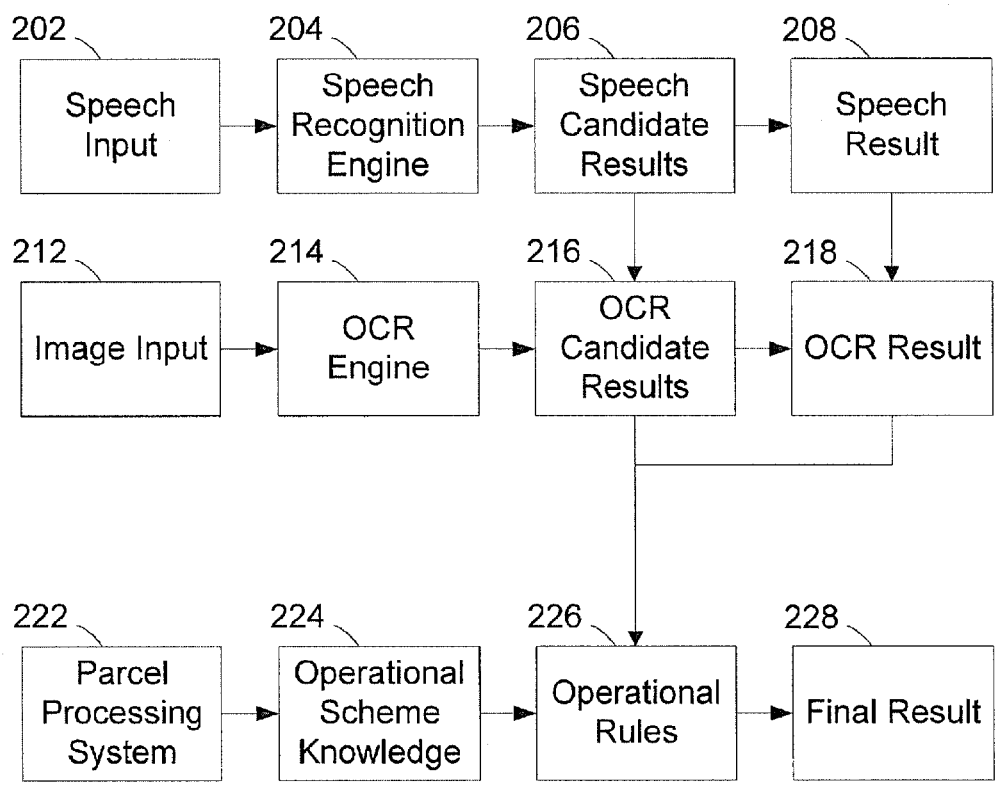
FIG. 2 depicts a block diagram illustrating a process flow in accordance with various embodiments.
Figure 3:
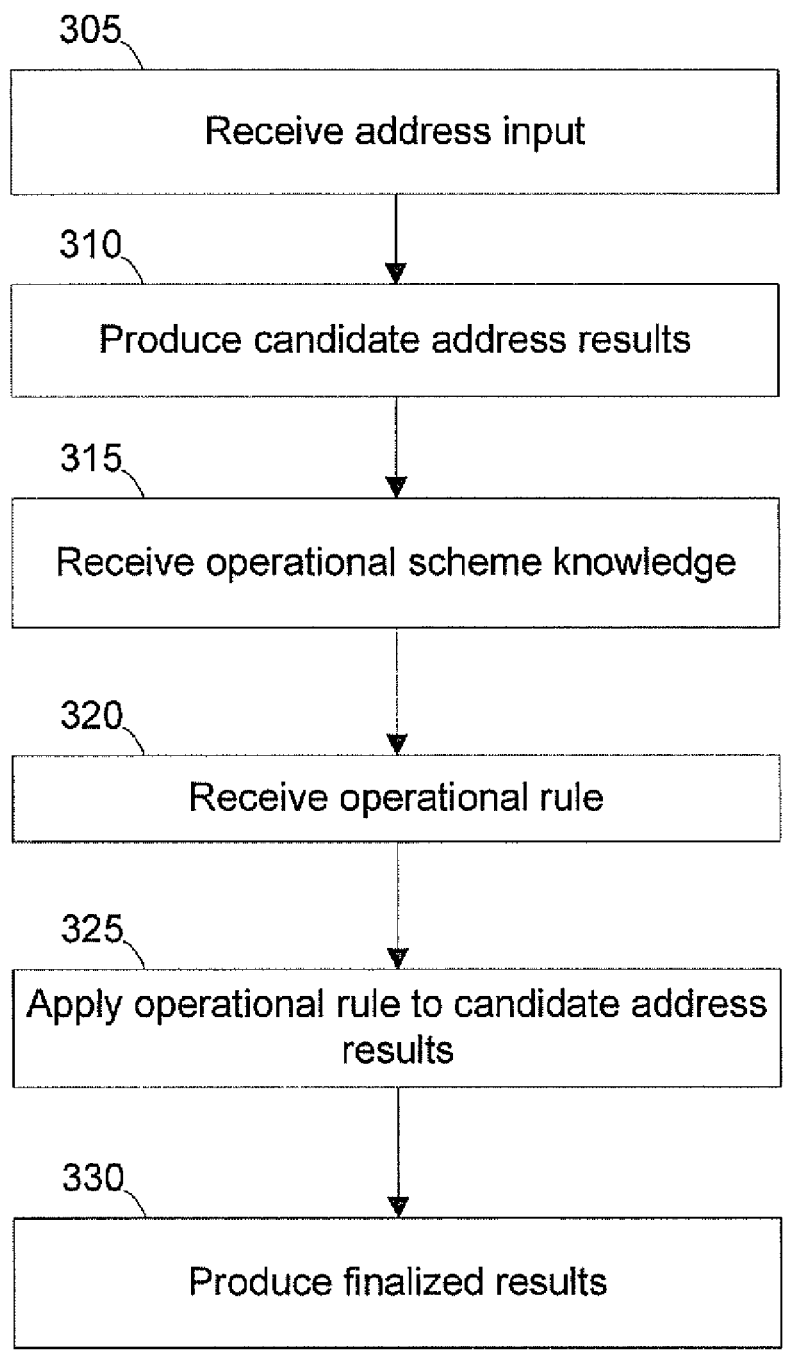
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Automated parcel processing equipment in combination with manual processing can efficiently and speedily process parcels to route to their destination. Postal and parcel processing facilities around the world currently use manual keying stations to enter destination information for small parcels, bundles and packages. These systems are very labor intensive because of the use of the operators' hands for package culling and positioning as well as the keying of the mail items. This results in a very low operational throughput per operator.

Optical character recognition (OCR) systems have been developed and tested to replace the manual keying stations. However, the read rate of these systems is not optimal and creates operational problems for the facility with a large number of rejects and exception handling processing.

A voice-assisted system assists the OCR by using speech recognition. The manual keying stations can be replaced with or augmented with hybrid voice stations allowing OCR and speech recognition technologies to be used in conjunction with each other, together with a set of the spoken syntax and a token rules syntax.

A processing facility can route parcels according to their needed processing. For example, a system can route parcels according to whether they are incoming and outgoing. On an incoming run, for example, the machine will be setup and have bins allocated for parcels coming from other facilities for local destination processing. The local destination processing is a sub-set of the national destination address set and therefore a large set of the destinations could be logically excluded from the possible destination choices. Further, the operational pre-knowledge can be used to reinforce possible OCR and speech recognition candidates.

Disclosed embodiments include improved systems and methods for parcel address recognition using OCR, speech recognition, and operational rules. The operational rules improve address recognition by specifying address recognition parameters based on the process being performed by the processing system and the destination and routing of the parcels.

U.S. Pat. Appn. No. 20090089236 describes a process for identifying information placed on a good to be processed, such as address information on a mailpiece, by using speech recognition techniques, and is incorporated by reference. U.S. Pat. No. 6,996,525 describes a method to use a recognizer's properties and performance measured in statistical terms to select a candidate from among several alternatives presented by independent speech recognizers, and is incorporated by reference. U.S. Pat. No. 7,145,093 describes a method and system for image processing that includes recognizing and processing written information on a package, and is incorporated by reference. U.S. Pat. No. 7,436,979 describes a method and system for image processing that includes scanning and processing of images and sub-images of mail pieces to decode address and other information, and is incorporated by reference.

"Parcel", as used herein, refers to postal mail and packages, whether processed by governmental, semi-governmental, or private entities, including but not limited to the United States Postal Service, other national postal services, and commercial parcel delivery and courier services, referred to herein as the "courier".

FIG. 1 shows a block diagram of an exemplary system 100 in accordance with disclosed embodiments. System 100 includes data processing hardware such as a processor 102 and storage 104 that can include volatile and non-volatile memory, optical or magnetic storage, or other computer-readable storage media as known to those in the art. System 100 can be implemented using one or more physical systems, and may include multiple processors 102 or storage 104; the examples below refer to these in the singular, but are not intended to limit the physical implementations.

System 100 also includes a speech input connection 106 in various embodiments. This can be, for example, a microphone or a connection to another device capable of receiving speech input from a user, wired or wirelessly. Speech input connection 106 is used to receive speech input for speech recognition as described herein.

System 100 also includes an image input connection 108 in various embodiments. This can be, for example, a tunnel scanner, camera, or other imaging device capable receiving an image of printed information for the parcel, wired or wirelessly. Image input connection 108 is used to receive images for optical character recognition as described herein.

System 100 also includes a rules database 110 in various embodiments, for example stored in storage 104. The rules database 110 includes operational rules based on operational scheme knowledge as described herein; these rules can aid address recognition based on the operational scheme or mode of the system 100.

System 100 also includes output device 112, which can be one or more of a display, a printer, and a communications interface for communicating with other systems. For example output device 112 can be used to display the result of the processes described herein, print a label, barcode, or other matter as part of the processes described herein, or send the result of these processes to another system for further action.

System 100, depending on implementation, can also include other devices and systems for parcel processing and handling, as known to those of skill in the art, not shown and not required for an understanding of the embodiments described herein.

FIG. 2 depicts a block diagram illustrating a process flow in accordance with various embodiments.

In this figure, speech input 202 is received by a speech recognition engine 204. In some embodiments, the speech input 202 is received by speech input connection 106, and the speech recognition engine 204 is implemented by system 100. The speech recognition engine 204 can be a process performed by processor 102, can be stored as computer-readable and computer-executable instructions in storage 104, and may access a speech recognition database also stored in storage 104.

The speech input 202 can be generated, for example, by an operator or other user reading all or a portion of an address or other printed information on a parcel. In this example, the speech input 202 represents a spoken destination address of "Arlington" as read by an operator from a parcel and received by the speech recognition engine 204.

The speech recognition engine 204 processes the speech input 202 to produce a list of speech candidate results 206 indicating possible City/State result alternatives. In performing the speech recognition process, speech recognition engine 204 may use a speech recognition database that includes possible City/State results for comparison with the speech input 202. In the particular example of FIG. 2, the speech candidate results 206 include Darlington Mo., Arlington Tex., and Arlington Tenn., with associated ZIP codes.

From the speech candidate results, the speech recognition engine 204 can perform a results arbitration process to produce a speech result 208; in other embodiments, the speech candidate results are used collectively as described below.

In this figure, image input 212 is received by a optical character recognition (OCR) engine 214. In some embodiments, the image input 212 is received by image input connection 108, and the OCR engine 214 is implemented by system 100. The OCR engine 214 can be a process performed by processor 102, can be stored as computer-readable and computer-executable instructions in storage 104, and may access an OCR database also stored in storage 104.

The image input 212 can be generated, for example, by a tunnel scanner or other camera or imaging device creating an image of all or a portion of a parcel, the image including printed information. In this example, the image input 212 represents a scanned image of a portion of a parcel that includes printed information and that is received by the OCR engine 214.

The OCR engine 214 processes the image input 212 to product a list of OCR candidate results 216 indicating possible City/State result alternatives. In performing the OCR process, OCR engine 214 may use an OCR database that includes possible City/State results for comparison with the image input 212. In the particular example of FIG. 2, the OCR candidate results 216 include Arlington Tex., Arlington Tenn., Arlington Ill., and Arlington Va., with associated ZIP codes.

From the OCR candidate results, the OCR engine 214 can perform a results arbitration process to produce a OCR result 218; in other embodiments, the OCR candidate results are used collectively as described below.

In this figure, parcel processing system 222 processes parcels, and can be implemented as part of system 100 or as a separate system. Parcel processing system 222 includes operational scheme knowledge 224 that describes the operating mode of the parcel processing system 222, such as processing incoming, locally-addressed parcels, processing outgoing parcels for a specific foreign or domestic delivery area, and others.

Operational scheme knowledge 224 is used by system 100, in some embodiments, in conjunction with operational rules 226. Where the parcel processing system 222 is implemented as part of system 100, system 100 can "receive" the operational scheme knowledge 224 as loaded from storage or received from another process. When the parcel processing system 222 is a separate system than system 100, then system 100 can receive the operation scheme knowledge 224 from parcel processing system 222 as a signal or communication between those systems. In general, as used herein, "receiving" can include loading from storage, receiving from another system using wired or wireless communications, receiving over a network such as the Internet, receiving from another process on the same system, and receiving as input from a user.

Operational rules 226 associate the operation scheme knowledge 224 with particular addressing restrictions. In this example, assume that the operation scheme knowledge 224 is that the parcel processing system 222 is processing incoming parcels that are locally addressed in the Tarrant County, Tex. area. The operational rules 226 for this example indicate that locally-addressed parcels in the Tarrant County, Tex. area all must have a delivery ZIP code that begins with 760, 761, or 762.

The system 100 receives the appropriate operational rules 226 to correspond with the operation scheme knowledge 224, and applies the operational rules 226 to one or more of the speech candidate results 206, speech result 208, OCR candidate results 216, and OCR result 218 to produce a final result 228. In various embodiments, the final result 228 is a unique result produced by restricting the speech candidate results 206 and/or OCR candidate results 216 to the acceptable alternatives defined by the operational rules 226 for the particular operation scheme knowledge 224. In this particular example, assume that operational rules 226 require that the result be in a ZIP code beginning with 760, 761, or 762 since the operation scheme knowledge indicates that incoming parcels are being processed for local addresses in the Tarrant County, Tex. area. By applying this requirement ef to the speech candidate results 206 and OCR candidate results 216, the only valid final result is Arlington Tex. 76001.

The final result is then stored and output by output device 112, such as by printing a delivery barcode corresponding to the final result on the parcel, on a label to be applied to the parcel, or by producing other appropriate output.

FIG. 3 depicts a flowchart of a process in accordance with disclosed embodiments, as can be perfoimed by a system such as that described above configured to perfoim the described steps, and can be implemented by computer-readable and computer-executable instructions stored in a computer-readable medium such as storage 104.

The system receives an address input related to a parcel (step 305). This step can include one or both of receiving a speech input related to the parcel and receiving an image input related to the parcel. The address input is typically associated with a destination address for the parcel, but can also or alternatively be associated with a return address for the parcel.

The system produces a list of candidate address results for the parcel (step 310). This step can include one or both of performing a speech recognition process, if a speech input was received, and performing an OCR process, if an image input was received. The candidate address results can therefore include one or both of speech candidate results and OCR candidate results.

The system receives operational scheme knowledge (step 315). The operational scheme knowledge describes the operating mode of the parcel processing system that is processing the parcel, such as but not limited to processing incoming, locally-addressed parcels, processing outgoing parcels for a specific foreign or domestic delivery area, and others.

The system receives at least one operational rule corresponding to the operational scheme knowledge (step 320). This step can include looking up and retrieving the rule from a rules database stored on the system. The rules can include, for example, city, state, or ZIP code addressing requirements corresponding to the operational scheme knowledge.

The system applies the operational rule(s) to the candidate address results (step 325). This can include including or excluding one or more of the candidate addresses according to the operational rule. As described herein, in some embodiments, the operational rule can eliminate at least some of the candidate address results based on the mode of operation of the parcel processing system.

The system produces a finalized result according to the operational rule and the candidate address results (step 330). The finalized result can be output, stored, or otherwise used for processing or labeling the package.

The embodiments disclosed herein are particularly useful when used with both speech recognition and OCR, in a "hybrid voice" configuration, since the operational rules and operational scheme knowledge can be used to resolve any difference in results found by the other processes. Using just speech recognition and OCR, the system otherwise not be able to break the "tie" between the two processes, and would have been forced to use manual coding or sorting. Using the machines operational scheme knowledge as pre-knowledge the system is able to finalize the result to address the parcel to its proper destination and therefore increase the accuracy, operational throughput and overall performance of the system over known techniques.

Various embodiments include a method, apparatus and process to enhance the accuracy of hybrid voice systems using the machine's operational scheme knowledge during parcel processing. Various embodiments can use machine operational knowledge to exclude destination addresses for postal addressed parcels thus reducing error rates and increasing system overall performance. Various embodiments can use machine operational knowledge to give weighted confidence on OCR and speech recognition results thus increasing read rates and increasing overall system performance.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for parcel address recognition, comprising:
   receiving an address input in a processing system having at least a processor and storage, the address input including a voice recognition input of an address on a parcel and an optical character recognition (OCR) input of the address on the parcel;
   producing candidate address results corresponding to the address input, the candidate address results including a plurality of voice recognition results and a plurality of OCR results;
   receiving operational scheme knowledge describing the mode of operation of a parcel processing system, the mode of operation being one of processing incoming, locally-addressed parcels or processing outgoing parcels for a specific foreign or domestic delivery area;
   receiving at least one operational rule corresponding to the operational scheme knowledge, the at least one operational rule including addressing requirements for the mode of operation;
   applying the at least one operational rule to the candidate address results, using the processor, to eliminate at least one voice recognition result and at least one OCR result; and
   producing and storing a finalized result according to the operational rule and the remaining candidate address results.

2. The method of claim 1, wherein receiving an address input includes receiving a voice input of an operator reading the address on the parcel.

3. The method of claim 1, wherein receiving an address input includes receiving an image input from an imaging device.

4. The method of claim 1, wherein producing candidate address results includes performing both a speech recognition process and an optical character recognition process.

5. The method of claim 1, wherein the finalized result is a unique result produced by restricting the voice recognition results and the OCR results to produce a unique result.

6. The method of claim 1, the address on the parcel is a return address for the parcel.

7. The method of claim 1, wherein the at least one operational rule eliminates at least some of the candidate address results based on the mode of operation of the parcel processing system.

8. A system for parcel address recognition, comprising a processor and memory, and configured to perform the steps of:
   receiving an address input, the address input including a voice recognition input of an address on a parcel and an optical character recognition (OCR) input of the address on the parcel;
   producing candidate address results corresponding to the address input, the candidate address results including a plurality of voice recognition results and a plurality of OCR results;
   receiving operational scheme knowledge describing the mode of operation of a parcel processing system, the mode of operation being one of processing incoming, locally-addressed parcels or processing outgoing parcels for a specific foreign or domestic delivery area;
   receiving at least one operational rule corresponding to the operational scheme knowledge, the at least one operational rule including addressing requirements for the mode of operation;
   applying the at least one operational rule to the candidate address results, using the processor, to eliminate at least one voice recognition result and at least one OCR result; and
   producing and storing a finalized result according to the operational rule and the remaining candidate address results.

9. The system of claim 8, wherein receiving an address input includes receiving a voice input of an operator reading the address on the parcel.

10. The system of claim 8, wherein receiving an address input includes receiving an image input from an imaging device.

11. The system of claim 8, wherein producing candidate address results includes performing both a speech recognition process and an optical character recognition process.

12. The system of claim 8, wherein the finalized result is a unique result produced by restricting the voice recognition results and the OCR results to produce a unique result.

13. The system of claim 8, wherein the address on the parcel is a return address for the parcel.

14. The system of claim 8, wherein the at least one operational rule eliminates at least some of the candidate address results based on the mode of operation of the parcel processing system.

15. A non-transitory computer-readable medium storing computer-executable instructions that, when executed, cause a system to perform i m the steps of:
   receiving an address input, the address input including a voice recognition input of an address on a parcel and an optical character recognition (OCR) input of the address on the parcel;
   producing candidate address results corresponding to the address input, the candidate address results including a plurality of voice recognition results and a plurality of OCR results;
   receiving operational scheme knowledge describing the mode of operation of a parcel processing system, the mode of operation being one of processing incoming, locally-addressed parcels or processing outgoing parcels for a specific foreign or domestic delivery area;
   receiving at least one operational rule corresponding to the operational scheme knowledge, the at least one operational rule including addressing requirements for the mode of operation;
   applying the at least one operational rule to the candidate address results to eliminate at least one voice recognition result and at least one OCR result; and
   producing and storing a finalized result according to the operational rule and the remaining candidate address results.

16. The computer-readable medium of claim 15, wherein receiving an address input includes receiving a voice input of an operator reading the address on the parcel.

17. The computer-readable medium of claim 15, wherein receiving an address input includes receiving an image input from an imaging device.

18. The computer-readable medium of claim 15, wherein producing candidate address results includes performing both a speech recognition process and an optical character recognition process.

19. The computer-readable medium of claim 15, wherein the finalized result is a unique result produced by restricting the voice recognition results and the OCR results to produce a unique result.

20. The computer-readable medium of claim 15, wherein the address on the parcel is a return address for the parcel.

21. The computer-readable medium of claim 15, wherein the at least one operational rule eliminates at least some of the candidate address results based on the mode of operation of the parcel processing system.

* * * * *